July 18, 1967 T. J. SULLIVAN 3,331,366
VERTICAL DIRECT-FIRED WATER HEATER
Filed March 22, 1965
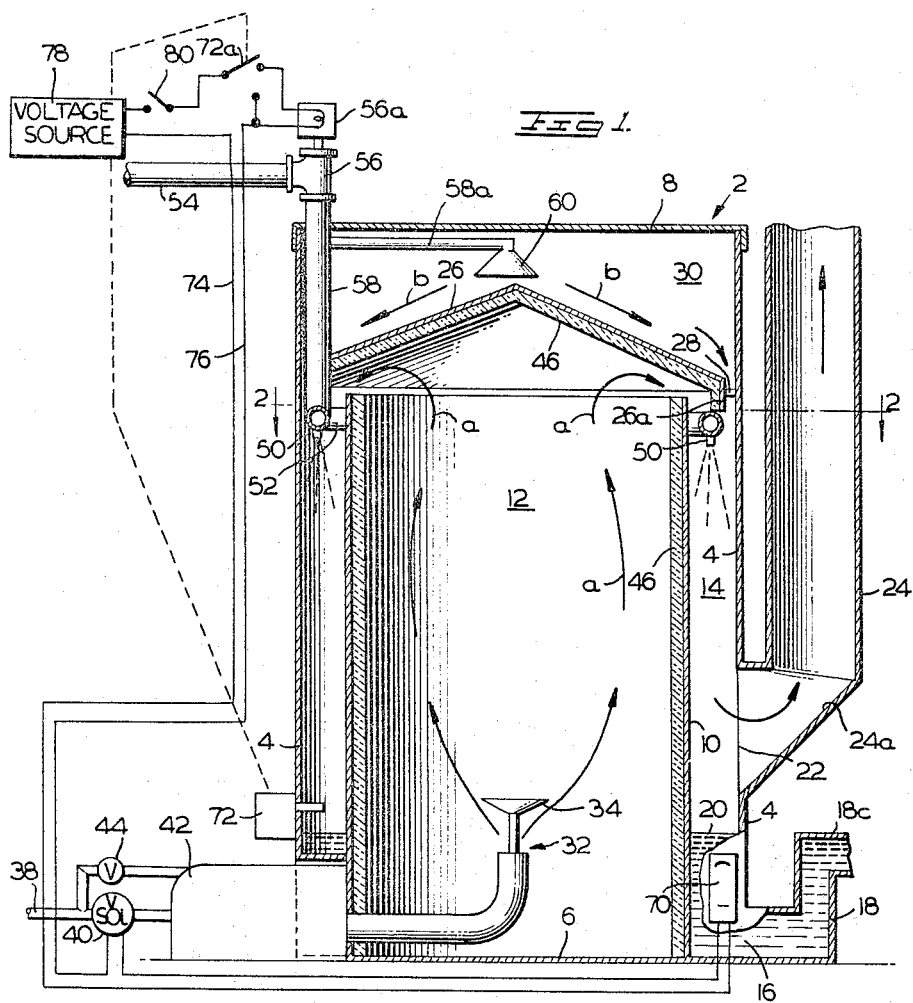
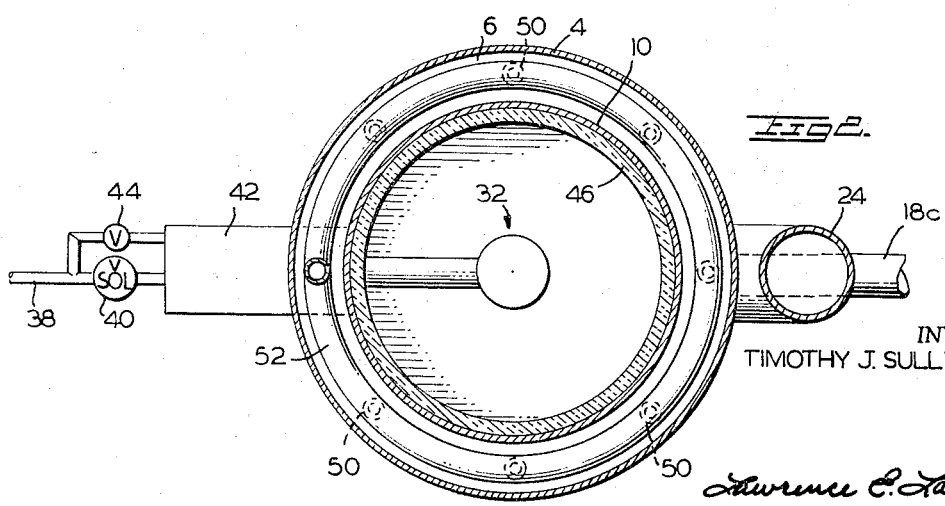
INVENTOR
TIMOTHY J. SULLIVAN
ATTORNEY

United States Patent Office 3,331,366
Patented July 18, 1967

---

3,331,366
VERTICAL DIRECT-FIRED WATER HEATER
Timothy J. Sullivan, Butte, Mont., assignor to Sullivan Valve and Engineering Company, Butte, Mont., a corporation of Montana
Filed Mar. 22, 1965, Ser. No. 441,729
3 Claims. (Cl. 126—350)

This invention relates generally to water heating apparatus of the type in which water to be heated is sprayed in direct contact with hot gases, and more particularly to water heating apparatus including a vertical spray chamber, means for spraying water downwardly in said chamber, and means for establishing a flow of hot gases downwardly in said chamber in direct heating contact with the sprayed water particles. Means are provided in the bottom of the chamber for collecting the heated water particles deposited by gravity, and vent means are provided in the side wall of the chamber affording an outlet for the hot gases flowing downwardly therethrough.

In my prior pending U.S. patent application Ser. No. 397,878, filed Sept. 21, 1964, and entitled, "Direct-Fired Water Heating Apparatus," a water heater is disclosed including a horizontal combustion chamber, and gas burner and vent means for establishing a horizontal flow of the hot combustion gas axially through the combustion chamber. In accordance with that invention, water is sprayed axially in said combustion chamber in the same direction as the hot combustion gases, whereupon at one end of the chamber the combustion gases are vented to atmosphere and the heated water is collected for subsequent use.

Owing to its horizontal arrangement, the prior water heating apparatus requires a certain amount of floor space, thus preventing use of the apparatus in certain installations. Furthermore, the jacketing of the apparatus and the protection of the horizontally-arranged combustion chamber walls must be given careful consideration for both safety and durability. Finally, full use of the force of gravity is not utilized in the prior horizontal embodiment for establishing maximum heating contact between the water particles and the combustion gases. Accordingly, a primary object of the present invention is to provide an improved water heating apparatus including a vertical water spray chamber, means for spraying water to be heated downwardly in said chamber, and means establishing a flow of hot gases downwardly in said chamber in direct heating contact with said sprayed water particles. According to one advantage of the improved construction, the floor space required for the apparatus is reduced, thus increasing the usefulness of the apparatus in commercial, residential and industrial applications where floor space and the location of the heater are major considerations.

Another object of the present invention is to provide an improved water heating apparatus including a vertical combustion chamber containing gas burner means at its lower end, passage means communicating at opposite ends with the upper portion of said combustion chamber and with the atmosphere, said passage means including a section defining a generally downwardly directed flow path, and means for spraying water to be heated downwardly in direct contact with the hot combustion gases flowing through said passage section. As a consequence of this construction, the hot water particles are drawn downwardly by the draft created by the flow of the combustion gas, are heated, and are deposited by gravity in a pool in the bottom of the water spray section. The hot combustion gases are subsequently vented to atmosphere, and the water collected in the pool is delivered to a demand. One advantage of this arrangement resides in the continuous heating of the water collected in the pool by the combustion gases during the flow thereof to atmosphere.

A further object of the invention is to provide water heating apparatus of the type described above wherein the upper and side walls of the combustion chamber are jacketed by chambers into which water is sprayed, thereby cooling the outer surfaces of the combustion chamber. In this manner, the external surfaces of the water heating apparatus are appreciably cooler than the walls of the combustion chamber, thereby permitting safe installation of the water heating apparatus in exposed areas. Furthermore, in accordance with another feature of the invention, when the interior surfaces of the combustion chamber walls are lined with a flame resistant material (for example, a refractory material such as glass) and the external surfaces of these walls are sprayed with water, the life of the direct-fired water heater apparatus is greatly increased over conventional heating equipment (particularly, apparatus of the type in which water flows through heating coils passing through the combustion chamber).

A more specific object of the invention is to provide water heating apparatus of the type set forth above in which the water spray passage comprises an annular chamber formed concentrically about the combustion chamber, said chambers communicating solely at their upper ends, the lower portion of said annular chamber being connected with the atmospheric vent. According to this improved construction, as the hot combustion gases flow downwardly in the annular chamber toward the outlet to vent, the water to be heated is sprayed downwardly in the annular chamber in direct contact with the hot gases. The hot water then is collected in a liquid pool in a trough defined in the bottom of the annular chamber, and is subsequently delivered to the load via water outlet means. The hot water outlet duct is so arranged as to establish a water seal for the outlet and consisting solely of said liquid pool.

According to a more specific object of the invention, the water is sprayed downwardly in the annular spray chamber by means of a plurality of circumferentially spaced nozzles to which water is supplied via a solenoid control valve. Similarly, fuel is supplied to the gas burner of the combustion means via other solenoid valve means. In accordance with another feature of the invention, electrical control means are provided for regulating the water and fuel supplies in accordance with the temperature of the water collected in the trough. If desired, water level switch means may also be provided for controlling the operation of water spray valve.

A more specific object of the invention is to provide a direct-fired water heating apparatus including a housing containing a vertical tubular wall cooperating with the housing wall to define an annular water spray chamber and a vertical combustion chamber contained within said annular chamber. The two chambers are in free communication at their upper ends, and a conical baffle is provided between the upper edge of the tubular wall and the upper wall of the housing. The water to be heated is not only sprayed downwardly in the annular chamber by downwardly-directed circumferential spaced first spray nozzles arranged therein, but also by a second spray nozzle means that spray water downwardly upon the upper surface of the baffle. Consequently the upper surface of the baffle and outer surface of the tubular wall are cooled by the sprayed water. The vent means are so designed that condensate formed therein is returned by gravity to the pool of liquid collected in the trough.

The water heating apparatus of the present invention has a relatively high recovery rate and is particularly suitable for use in various commercial and industrial installations where large quantities of heated water are required. The apparatus is also useful in such large demand commercial and domestic installations as heating systems for swimming pools and the like provided with water filtering or purifying means. The water heating apparatus is economical in operation, and is quite durable and relatively inexpensive to construct, assemble, install and maintain.

Other objects and advantages of the invention will become apparent from a study of the following specification when considered in conjunction with the accompanying drawing, in which:

FIGURE 1 is a sectional elevational view of the water heating apparatus, the electrical circuitry of the apparatus being illustrated schematically; and FIGURE 2 is a sectional view taken along line 2—2 of FIGURE 1.

Referring to the drawing, the water heating apparatus includes a metal housing 2 having a cylindrical side wall 4, a bottom wall 6 and a top wall 8. Extending upwardly (in fluid sealed relation) from the bottom wall 6 is a tubular wall 10 that contains vertical combustion chamber 12 and is spaced from side wall 4 to define an annular water spray chamber 14. The upper edge of the tubular wall 10 is spaced from the housing top wall 8 whereby chambers 12 and 14 communicate solely at their upper ends.

Adjacent the bottom wall 6, the side wall 4 contains an outlet 16 affording communication between the bottom portion of the annular water spray chamber 14 and the hot water supply conduit 18. As shown in FIGURE 1, the hot water supply conduit includes a vertical section 18a that is connected at its lower end with water outlet 16 via horizontal section 18b. The upper end of the vertical section is connected with a second horizontal section 18c having a higher elevation than that of outlet 16. As will be described below, owing to this higher elevation of conduit section 18c relative to outlet 16, the lower portion of annular chamber 14 serves as a trough for collecting a pool of heated water 20 which serves as a liquid seal for the outlet 16.

Adjacent, but at a higher elevation than, outlet 16, the housing wall 4 contains a vent outlet 22 that affords communication between the lower portion of tubular chamber 14 and a vertical vent conduit 24 the upper end of which communicates with atmosphere.

Mounted between and spaced from the upper end of tubular wall 10 and the upper housing wall 8 is a downwardly divergent conical canopy of baffle 26. The outer peripheral lower edge of the conical baffle 26 has a diameter that is greater than the outer diameter of tubular wall 10 but less than the internal diameter of housing side wall 4. Preferably the baffle 26 includes a downwardly directed annular peripheral flange 26a that extends partially into the upper end of annular chamber 14 and is spaced from the inner and outer walls thereof. The baffle 26, which may be supported in the housing by any suitable means (for example, by circumferentially spaced supporting brackets 28), cooperates with the side wall 4 and the upper wall 8 to define a third chamber 30 that communicates at its lower end with the annular chamber 14 via the annular passage defined between the annular baffle flange 26a and the housing wall 4.

Mounted in the bottom of combustion chamber 12 is an upwardly directed gas burner 32 having a generally conical, upwardly-divergent stainless steel baffle and distributing plate 34 for insuring complete combustion of the fuel supplied to the burner via fuel supply conduit 38, normally-closed solenoid valve 40, and the gas burner control means 42. The gas burner controls are conventional and include pressure regulator and automatic pilot valve means (not shown). A manually operable by-pass valve 44 is connected across the solenoid valve 40 for supplying a limited amount of fuel to the automatic pilot light means of the gas burner controls 42.

Owing to the draft established by the atmospheric vent 24, the hot combustion gases generated in the combustion chamber 12 by the gas burner means 32 flow upwardly in the chamber 12 toward the baffle 26, and are deflected downwardly by the baffle into the annular chamber 14 via the space between the upper end of tubular wall 10 and the annular flange 26a as shown by the arrows a (FIGURE 1). The hot combustion gases then flow downwardly in the annular passage 14 toward the vent opening 22. Preferably the lower surface of the baffle 26 and the inner surface of the tubular wall 10 are lined with layers 46 of a flame-resistant refractory material, such as glass.

In accordance with the present invention, water spray means are provided for spraying particles of water downwardly in the annular chamber 14 in direct intermingled contact with the hot combustion gases, whereby the water particles are heated to a relatively high temperature and are collected, by gravity, in pool 20. The water is sprayed into the annular chamber 14 by a plurality of downwardly-directed, circumferentially-spaced nozzles 50 that communicate with and are carried by the annular water duct 52. Water is fed to the annular duct 52 from supply conduit 54 via normally-closed solenoid valve 56 and vertical leg 58. Furthermore, water is sprayed downwardly upon the upper surface of conical baffle 26 by means of an auxiliary nozzle 60 to which water is supplied by the feeder and conduit 58a. This water spray passes across the upper surface of the baffle 26 and passes downwardly into the annular passage via the annular space between the flange 26a and the housing side wall 4. Owing to the draft created by the downward flow of the combustion gases toward the outlet 22 to vent, the heated water particles flow downwardly toward the bottom wall of annular chamber 14 and are collected in the aforementioned pool of water 20. Furthermore, the condensate formed in vertical duct 24 is deposited by gravity on inclined surface 24a and is returned to the lower portion of annular chamber 14.

As shown by the schematic electrical diagram, the fuel and water solenoid valves 40 and 56, respectively, are controlled by temperature responsive switch means 70 in accordance with the temperature of the heated water collected in pool 20. Preferably, although not necessarily, the water solenoid valve 56 is also controlled by water level switch means 72, 72a in accordance with the level of the liquid 20 collected in the bottom of the annular chamber 14. Conductors 74, 76 connect in series with the voltage source 78 the starting switch 80, the dual-position switch means 72, the solenoid of valve 56, the temperature-responsive switch 70, and the solenoid of valve 40.

*Operation*

Assume that switches 72a and 80 are in their illustrated conditions and that the level and temperature of the water in trough 20 are less than their maximum limits. Assume further that the valve 44 is open and that the pilot light is on. Since solenoid valves 40 and 56 are open, the main burner is off and there is no spray of water.

Upon closing the main switch 80, valves 40 and 56 become energized, whereupon the main burner flame is established, and water is supplied to the spray nozzles 50 and 60. Water is sprayed downwardly upon the upper surface of baffle 26 by nozzle 60, and the nozzles 50 establish a substantially annular downward spray of water in the chamber 14. The combustion gases flow upwardly in chamber 12, into the annular gap between baffle flange 26a and tubular wall 10 (as shown by arrows a), downwardly through the chamber 14 toward the vent outlet 22, and upwardly to atmosphere via vent conduit 24. The sprayed water drawn downwardly from chamber 30 to chamber 14 (as shown by the arrows b) by the draft created by the flow of combustion air to vent, and the water sprayed downwardly by the nozzles 50, is heated by the hot combustion gases and is deposited by gravity in liquid pool 20. The water in this pool continues to be heated to a certain extent by the flow of the hot combustion gases across the upper surface thereof. Moisture entrained in the combustion gases flowing upwardly in vent conduit 24 is condensed, deposited by gravity upon inclined surface 24a, and is returned to chamber 14 for collection in pool 20. Hot water may now be supplied to the demand via water outlet 16 and conduit 18.

In the event that the temperature of the water in pool 20 rises above a predetermined value, temperature-responsive switch means 70 opens to de-energize solenoid valves 40 and 56, whereupon the main burner flame is extinguished and the supply of sprayed water is interrupted.

In the event that during the water heating operation, the level of the liquid in the pool 20 rises above a given level, switch 72, 72a opens to close solenoid valve 56 whereupon the spray of water is interrupted. Assuming that the temperature of the water in pool 20 is below the maximum value, the combustion gases generated in chamber 12 that flow to vent via chamber 14 continue to heat the water in pool 20. When the temperature of this water reaches the maximum limit, switch 70 opens to open solenoid valve 40, whereupon the supply of fuel is interrupted to the main burner, and the main burner flame is extinguished.

It is apparent that by appropriate electrical connections, the valves 40 and 56 may be operated simultaneously or sequentially, as desired, in accordance with water temperature, water level, or the like. In some cases it may be desired to include means responsive to the temperature of the incoming water supplied via conduit 54 for controlling, in combination with the temperature responsive means 70, the operation of the system.

As is now apparent, the water heating apparatus of the present invention affords an extremely, safe, durable maintenance-free device. Owing to the lining of the internal surfaces of the combustion chamber with a refractory material and the spraying of water upon the outer surfaces, the life of the combustion chamber components is greatly increased. Owing to the relatively large volume of water that may be heated in a given period of time, the apparatus is particularly suitable for use in large industrial and commercial applications. When the heated water supplied through conduit 18 is purified by suitable filter means, the water may be used in such applications as swimming pools, showers, baths and the like.

While in accordance with the provisions of the patent statutes the preferred form and embodiment of the invention has been illustrated and described, it will be apparent to those skilled in the art that other modifications and variations may be made in the apparatus described without deviating from the invention recited in the following claims.

What is claimed is:
1. Water heating apparatus comprising
    a housing including top, bottom and cylindrical side walls, a vertical tubular wall extending upwardly from said bottom wall and cooperating therewith to define within said tubular wall a combustion chamber, the upper end of said tubular wall being spaced from said top wall, said tubular wall being spaced from said side wall to define an annular mixing chamber, said housing containing also in communication with the lower portion of said annular chamber a water outlet and an atmospheric vent outlet, said vent outlet having a higher elevation than said water outlet;
    a conical sheet-like baffle mounted in said housing between and spaced from said top wall and the upper extremity of said tubular wall, said baffle converging upwardly and having at its lower edge an outer diameter greater than that of said tubular wall and less than that of said side wall, the lower surface of said baffle and the inner surface of said tubular wall being lined with insulation;
    means for spraying a generally annular curtain of water downwardly in said annular chamber toward the bottom thereof, comprising first nozzle means including a horizontal annular duct arranged in the upper portion of said annular chamber adjacent the lower edge of said baffle, said duct containing spaced downwardly directed discharge openings, second spray nozzle means including a spray nozzle arranged above and directed downwardly toward the apex of said conical baffle, and conduit means for supplying water under pressure to said first and second spray nozzle means;
    gas burner means arranged within said tubular wall for establishing a flow of combustion gases successively upwardly within said combustion chamber toward the lower surface of the conical baffle, radially outwardly toward the side wall, and downwardly in said annular chamber toward said vent outlet in direct heating contact with the sprayed water, whereby combustion gases are vented from said housing via said vent outlet, and heated water is removed from said housing via said water outlet;
    a water supply solenoid valve connected in said conduit means for controlling the flow of water to said spray nozzle means;
    and means responsive to the temperature of the water heated by the combustion gases for controlling the operation of said water supply solenoid valve.

2. Apparatus as defined in claim 1, and further including means including another solenoid operated valve for supplying fuel to the gas burner of said gas burner means, and means responsive to the temperature of the water heated by the combustion gases for controlling the operation of said other solenoid operated valve.

3. Apparatus as defined in claim 1, and further including means responsive to the level of the liquid collected in the bottom of said annular chamber for closing said water supply solenoid valve.

References Cited

UNITED STATES PATENTS

| | | | |
|---|---|---|---|
| 461,867 | 10/1891 | Flanders | 126—350 |
| 1,070,052 | 8/1913 | McSalley | 126—350 |
| 1,527,740 | 2/1925 | Lipshitz | 126—359 |
| 1,560,806 | 11/1925 | Schuckher | 126—359 |
| 2,767,784 | 10/1956 | Dean | 126—350 X |
| 3,026,867 | 3/1962 | Size | 126—350 |
| 3,204,629 | 9/1965 | Newton | 126—355 |

FOREIGN PATENTS 7,031    1905    Great Britain.

KENNETH W. SPRAGUE, *Primary Examiner.*
ROBERT A. DUA, *Examiner.*